(12) United States Patent
Kubo et al.

(10) Patent No.: US 7,778,123 B2
(45) Date of Patent: Aug. 17, 2010

(54) OPTICAL DISK DRIVE CAPABLE OF DETECTING ANOMALIES IN OPTICAL PICK-UP TRANSFER MECHANISM

(75) Inventors: Hideki Kubo, Tokorozawa (JP); Kazuhiko Kameda, Tokorozawa (JP)

(73) Assignee: TEAC Corporation, Tama-shi, Tokyo (JP)

( * ) Notice: Subject to any disclaimer, the term of this patent is extended or adjusted under 35 U.S.C. 154(b) by 709 days.

(21) Appl. No.: 11/725,640

(22) Filed: Mar. 19, 2007

(65) Prior Publication Data

US 2007/0223338 A1 Sep. 27, 2007

(30) Foreign Application Priority Data

Mar. 22, 2006 (JP) ............................... 2006-079659

(51) Int. Cl.
*G11B 7/00* (2006.01)

(52) U.S. Cl. ............... 369/44.32; 369/30.36; 369/53.12

(58) Field of Classification Search ........................ None
See application file for complete search history.

(56) References Cited

U.S. PATENT DOCUMENTS

| | | | | |
|---|---|---|---|---|
| 4,710,691 A | * | 12/1987 | Bergstrom et al. | ........... 318/696 |
| 5,084,661 A | * | 1/1992 | Tanaka | .................. 318/685 |
| 6,019,495 A | * | 2/2000 | Yamada et al. | ................ 701/37 |
| 6,222,340 B1 | * | 4/2001 | Kawabata et al. | ........... 318/685 |
| 2004/0156288 A1 | * | 8/2004 | Shigeta et al. | ........... 369/53.18 |

FOREIGN PATENT DOCUMENTS

| | | |
|---|---|---|
| JP | 59178654 A | 10/1984 |
| JP | 2003100041 A | 4/2003 |
| JP | 2003173545 A | 6/2003 |
| JP | 2005243141 A | 9/2005 |

OTHER PUBLICATIONS

English Language Translation of Japanese Office Action relating to Japanese Patent Application No. 2006-079659, mailed Jun. 8, 2010, 2 pages.

Japanese Office Action relating to Japanese Patent Application No. 2006-079659, mailed Jun. 8, 2010, 2 pages.

* cited by examiner

*Primary Examiner*—Paul Huber
(74) *Attorney, Agent, or Firm*—Seed IP Law Group PLLC

(57) ABSTRACT

An optical disk drive capable of detecting occurrence of tooth jump in a mechanism for transferring an optical pickup. The optical pickup is transferred in a radial direction of an optical disk by means of a stepping motor. A control section having received a seek operation command from a host machine drives the stepping motor by way of a controller, to thus cause the optical pickup to perform seek up to a target address. The amount of displacement between a current address achieved after seek operation and a target address is computed. When the amount of displacement is equal to or greater than a pitch P of the transfer mechanism; namely, the pitch P of a lead screw, the tooth jump is determined to have arisen. Seek conditions are changed, and seek is reperformed.

15 Claims, 7 Drawing Sheets

OPTICAL DISK DRIVE CAPABLE OF DETECTING ANOMALIES IN OPTICAL PICK-UP TRANSFER MECHANISM

PRIORITY INFORMATION

This application claims priority to Japanese Patent Application No. 2006-79659, filed on Mar. 22, 2006, which is incorporated herein by reference in its entirety.

BACKGROUND

1. Technical Field

The present invention relates to an optical disk drive, and more particularly to transfer control of an optical pickup.

2. Related Art

An optical disk drive has hitherto performed seeking operation by means of transferring an optical pickup in a radial direction of an optical disk by means of a stepping motor.

FIGS. 6 and 7 show the configuration of an optical disk drive and the configuration of a transfer mechanism, which are described in the related art shown in JP2003-100041A. An optical pickup 310 has a semiconductor laser (LD) and emits a laser beam modulated according to recording data, thereby recording data on an optical disk 10; and emits a laser beam of reproducing power and receives light reflected from the optical disk 10, to thus generate a reproduced signal.

A decoder 320 decodes the reproduced signal from the optical pickup 310; generates an address signal or the like; and supplies a control section 330 with the thus-generated address signal or the like.

The control section 330 comprises a CPU, ROM, RAM, and the like, and controls seeking operation. Specifically, upon receipt, from a host machine such as a personal computer or the like, of a seek operation command including a target address corresponding to a destination where the optical pickup 310 is to be transferred, the control section 330 computes the number of pulse signals to be imparted to a stepping motor 100, and supplies a controller 340 with the number of pulse signals. In accordance with the command from the control section 330, the controller 340 supplies a driver 350 with a drive control signal. In accordance with the drive control signal, the driver 350 controls the number of rotations of and the rotational speed of the stepping motor 100.

As shown in FIG. 7, the stepping motor 100 is provided with a lead screw 110 in which a helical groove is formed at a given pitch P, and the lead screw 110 is mounted in parallel with the radial direction of the optical disk 10. The optical pickup 310 is disposed so as to be movable along the groove of the lead screw 110. Every time the stepping motor 100 rotates one turn, the optical pickup 310 is moved in the radial direction of the optical disk 10 by one pitch P of the lead screw 110.

With such a configuration, the control section 330 computes a difference between the current address supplied from the decoder 320 at the end of seeking operation and the target address received from the host machine at the commencement of seeking operation. When the computed amount of positional displacement exceeds an allowable amount, the stepping motor 100 is determined to be out of step (hereinafter called a "step-out"), and the rotational speed of the stepping motor 100 is reduced. Here, the term "step-out" means a phenomenon in which the torque of the stepping motor 100 becomes deficient for reasons of an increase in a pulse frequency applied to the stepping motor 100 and in which the stepping motor 100 does not rotate even when the pulse voltage is applied to the stepping motor 100.

However, in addition to including the step-out of the stepping motor 100, the problem of the transfer mechanism also includes a problem of so-called "tooth jump" in which a teeth section 310a provided in the optical pickup 310 is disengaged from the lead screw 110. Occurrence of tooth jump leads to dissociation of a target address from a current address. The tooth jump is considered to be caused primarily by abrasion of or damage to the teeth section 310a attributable to time-varying operations, collision, or the like, or by oscillation or the like. This problem does not arise solely in the stepping motor 100 but can also arise likewise in the case of use of a DC motor.

SUMMARY

The present invention provides an apparatus which can efficiently detect an anomaly, such as tooth jump, between an optical pickup and a lead screw, thereby preventing dissociation between a target address and a current address.

The present invention provides an optical disk drive comprising:

a motor;

an optical pickup which irradiates an optical disk with a laser beam;

a transfer mechanism which engages with the motor and transfers the optical pickup in a radial direction of the optical disk by means of rotation of the motor; and control means which compares the amount of displacement between an address achieved after transfer operation performed by the transfer mechanism and a target address with a pitch of the transfer mechanism and determines occurrence of an anomaly in the transfer mechanism when the amount of displacement is equal to or greater than the pitch.

The present invention provides an optical disk drive comprising:

a motor;

an optical pickup which irradiates an optical disk with a laser beam;

a transfer mechanism which engages with the motor and transfers the optical pickup in a radial direction of the optical disk by means of rotation of the motor;

focus servo means for subjecting the optical pickup to focus control; and control means which determines occurrence of an anomaly in the transfer mechanism when the focus control of the focus servo means is interrupted in accordance with a servo signal from the focus servo means, to thus interrupt transfer of the optical pickup performed by the transfer mechanism, compares the amount of displacement between an address achieved after transfer operation of the transfer mechanism and a target address with a pitch of the transfer mechanism when the focus control is not interrupted, and determines occurrence of an anomaly in the transfer mechanism when the amount of displacement is equal to or greater than the pitch.

Moreover, the present invention provides an optical disk drive comprising:

a motor;

an optical pickup which irradiates an optical disk with a laser beam;

a transfer mechanism which engages with the motor and transfers the optical pickup in a radial direction of the optical disk by means of rotation of the motor;

focus servo means which generates a focus error signal from a reproduced signal from the optical pickup and subjects the optical pickup to focus control in accordance with the focus error signal; and control means which determines occurrence of an anomaly in the transfer mechanism when the level of the focus error signal exceeds a predetermined threshold value, to thus interrupt transfer of the optical pickup performed by the transfer mechanism, compares the amount of displacement between an address achieved after transfer operation performed by the transfer mechanism and a target address with a pitch of the transfer mechanism when the focus control operation is not interrupted, and determines occurrence of an anomaly in the transfer mechanism when the amount of displacement is equal to or greater than the pitch.

According to the present invention, the amount of displacement between the address achieved after transfer of the optical pickup and the target address is compared with the pitch of the transfer mechanism, thereby determining occurrence of an anomaly (tooth jump or the like) in the transfer mechanism. Accordingly, an anomaly, such as tooth jump or the like, can be detected reliably.

The invention will be more clearly comprehended by reference to the embodiments provided below. However, the scope of the invention is not limited to the embodiments.

BRIEF DESCRIPTION OF THE DRAWINGS

Preferred embodiments of the present invention will be described in detail based on the following figures, wherein.

DETAILED DESCRIPTION

Figure 6:
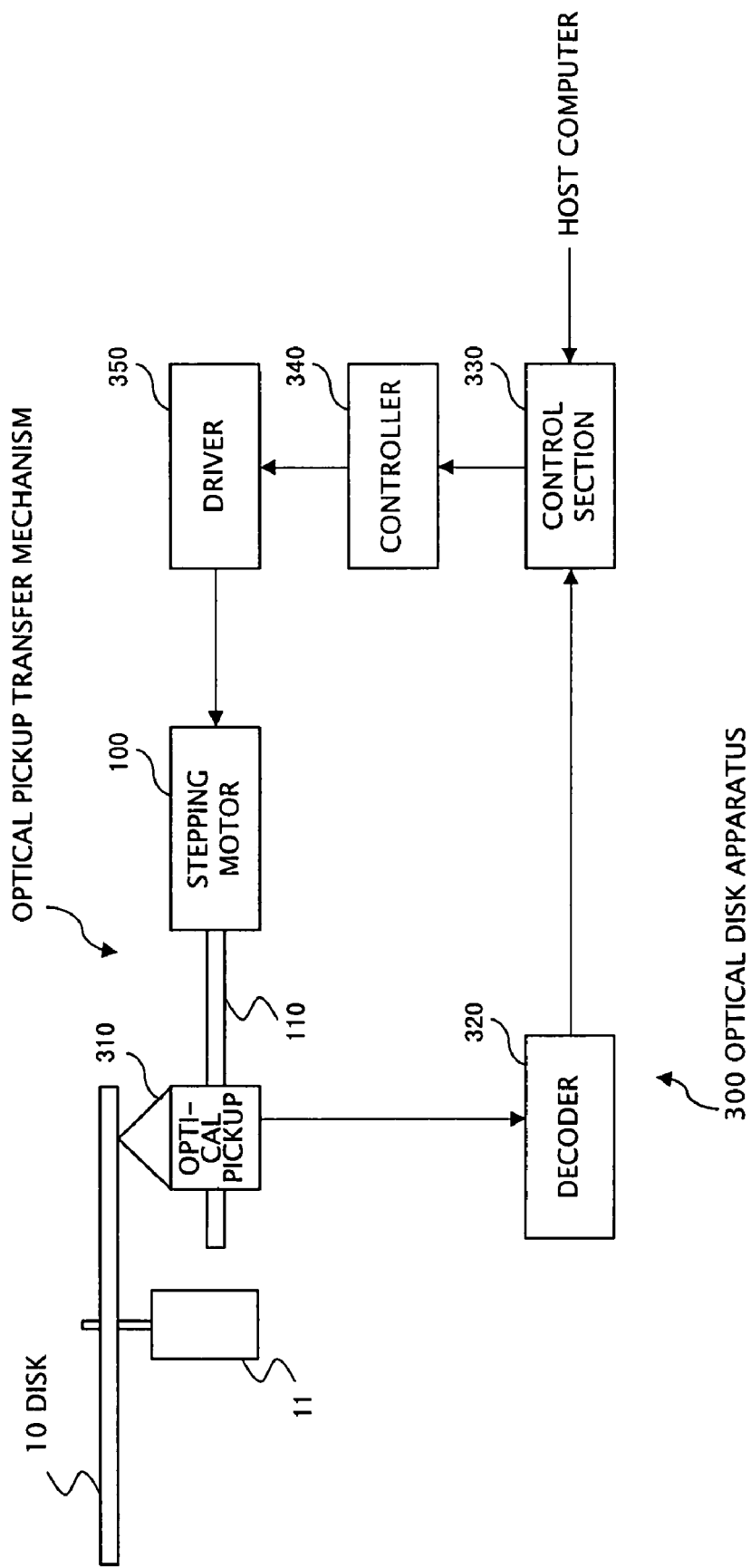
FIG. 6 is a block diagram of a related-art apparatus.

Embodiments of the present invention will be described hereinbelow by reference to the drawings. Those members identical with those of the related-art apparatus shown in FIG. 6 are assigned the same reference numerals.

First Embodiment

Figure 1:
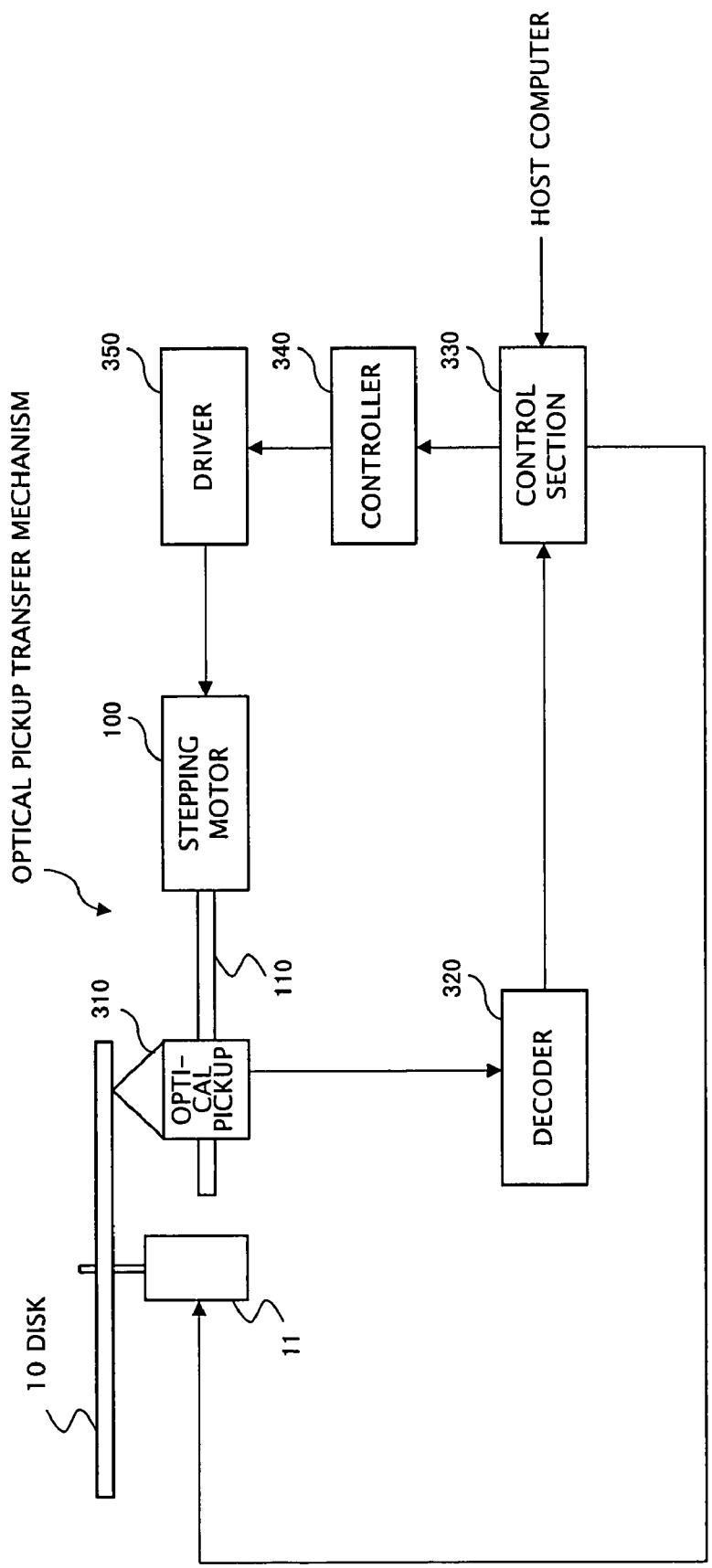
FIG. 1 is a block diagram of an optical disk drive of an embodiment of the present invention.
Figure 7:
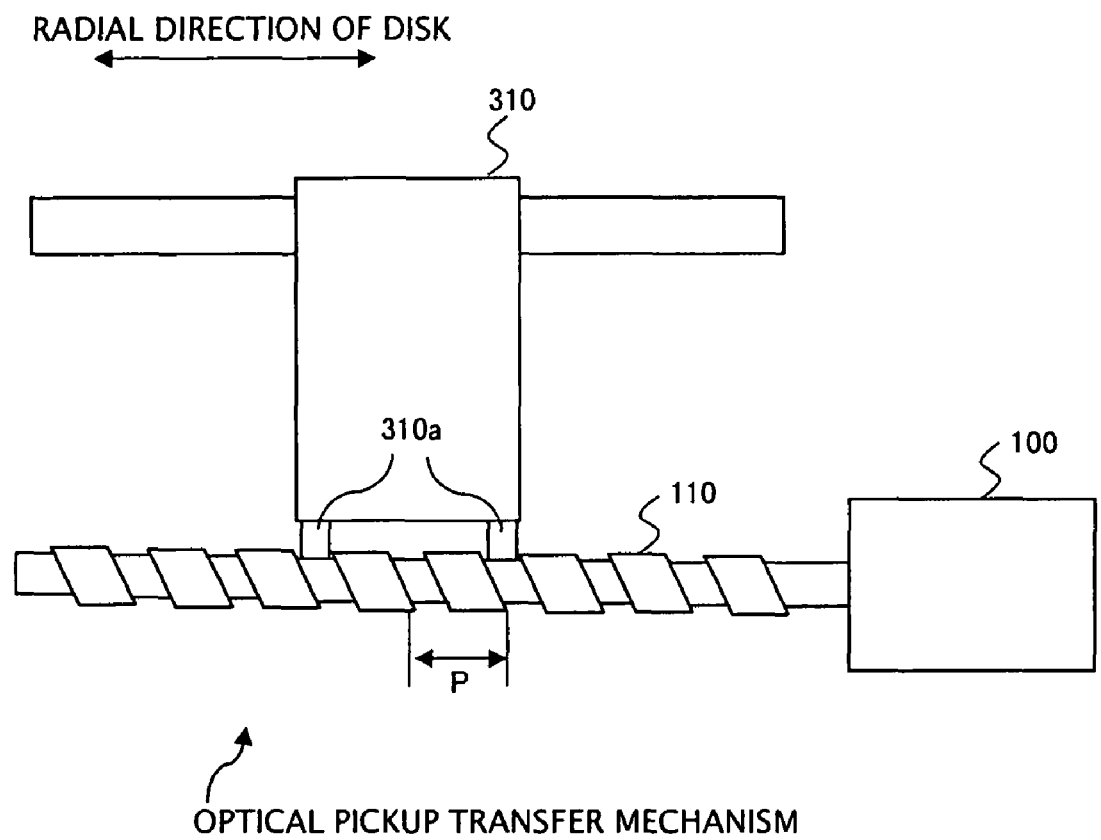
FIG. 7 is a descriptive view of a transfer mechanism of the related-art apparatus.

FIG. 1 shows the configuration of an optical disk drive of a present embodiment. A seek operation start command from a host machine, such as a personal computer or the like, is supplied to a control section 330. The control section 330 has a CPU, ROM, RAM, and the like, and supplies a controller 340 with a control signal. Rotation of a stepping motor 100 is controlled by the controller 340 and a driver 350. As shown in FIG. 7, an optical pickup 310 is coupled to a lead screw 110 by way of a teeth section 310a, and is moved in a radial direction of an optical disk 10 by means of rotation of the lead screw 110. The optical pickup 310 irradiates an optical disk 10, which is rotationally driven by a spindle motor 11, with a laser beam of recording power, to thus record data; or irradiates the optical disk 10 with a laser beam of reproducing power, to thus reproduce recorded data. A reproduced signal from the optical pickup 310 is supplied to a decoder 320. The decoder 320 decodes the reproduced signal and supplies decoded data and address data to the control section 330.

In accordance with the seek operation start command from the host machine, the control section 330 moves the optical pickup 310; and subsequently compares an address (a current address) supplied from the decoder 320 with a target address, thereby determining whether or not seek has been performed normally, from the amount of a displacement between the target address and the current address. At the time of a determination, the threshold value to be compared with the amount of displacement is not a predetermined allowable amount of displacement as in the related art, but is set according to the pitch of the transfer mechanism so as to detect tooth jump. Specifically, as shown in FIG. 7, the optical pickup 310 meshes with the lead screw 110 by way of the teeth section 310a, and is transferred in the radial direction of the optical disk 10 according to the pitch P of the lead screw 110. When tooth jump has arisen; i.e., when the teeth section 310a has run on the groove of the lead screw 110, as a result of the teeth section 310a formed in the optical pickup 310 becoming disengaged from the lead screw 110, dissociation of the lead screw 110 at least corresponding to the pitch P arises. Attention is directed toward this point, and the control section 330 compares the amount of displacement between the target address and the current address with the pitch P of the lead screw 110, thereby determining whether or not the tooth jump has arisen during seeking operation.

Figure 2:
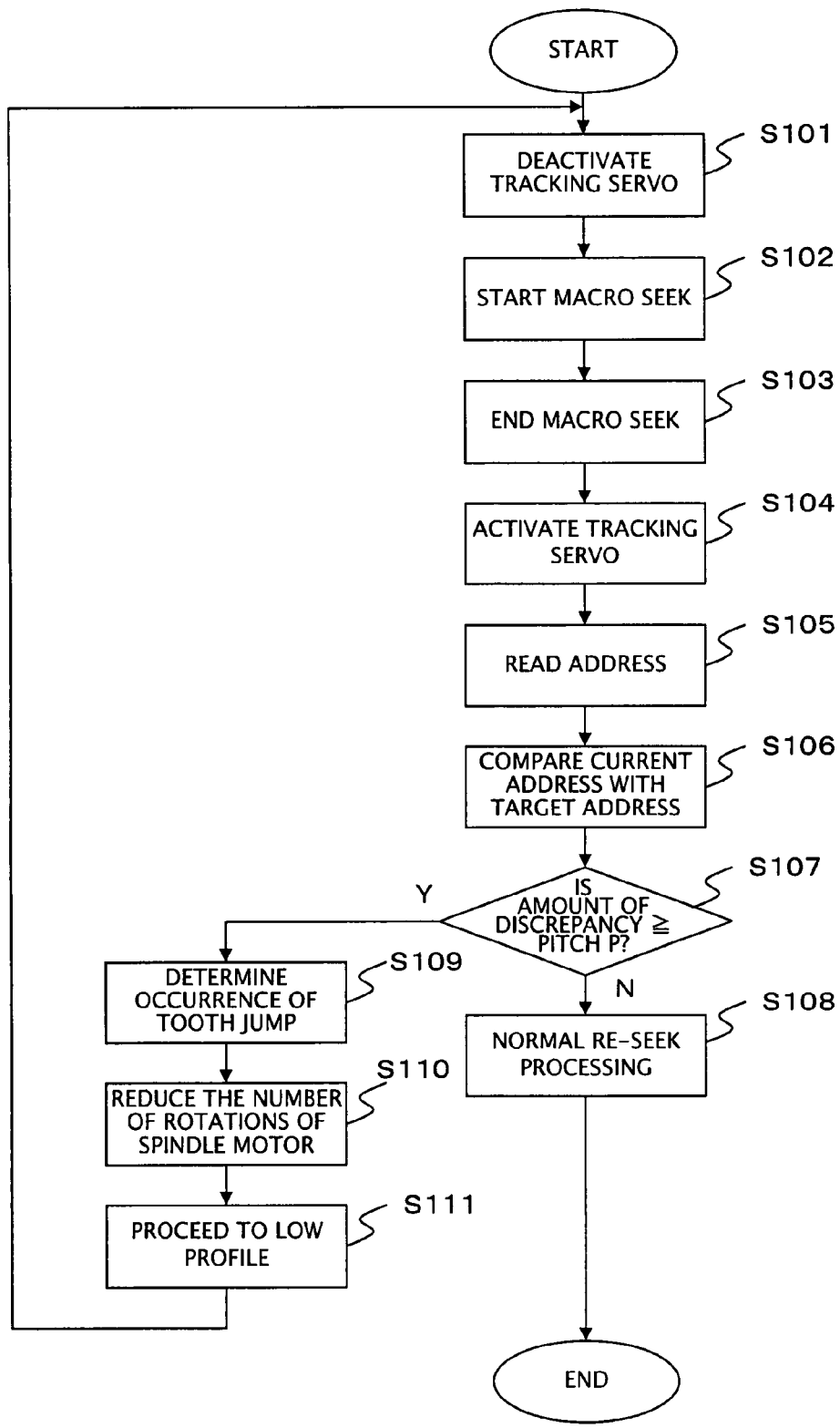
FIG. 2 is a processing flowchart of the embodiment.

FIG. 2 shows a processing flowchart of the present embodiment. First, when the seek operation start command is received from the host machine, tracking servo is deactivated (S101), and the stepping motor 100 is driven to commence macro seek (S102). Herein, the macro seek means transfer of the optical pickup 310 in the radial direction of the optical disk 10. In contrast, a term "micro jump" to be described later means the movement of only an objective lens mounted in the optical pickup 310 in the radial direction without involvement of transfer of the optical pickup 310. The control section 330 computes a distance (travel distance) required from the current address to the target address received from the host machine; computes a required number of pulse signals; and drives the stepping motor 100. A rotational angle of the stepping motor 100 is specified by the number of pulse signals, and the rotational speed of the stepping motor is specified by a pulse frequency.

After completion of macro seek (S103), tracking servo is reactivated (S104). The current address achieved after completion of macro seek is read by the decoder 320 (S105), and the thus-read address is supplied to the control section 330. The control section 330 compares the current address, which is achieved at the time of completion of macro sheet and supplied from the decoder 320, with the target address received from the host machine (S106). Specifically, the amount of displacement between the target address and the current address is computed, and the thus-computed amount of displacement is compared with the pitch P of the lead screw 110.

As a result of a comparison, when the amount of displacement is smaller than the pitch P (NO is selected in S107), ordinary re-seeking operation is then performed, as tooth jump has not arisen during the macro seek and the macro seek has been completed normally (S108). In normal re-seeking operation, the macro seek is reperformed according to the amount of displacement between the target address and the current address, or micro jump for moving only the objective lens is performed.

Meanwhile, when the amount of displacement is equal to or greater than the pitch P (YES is selected in S107), the took jump is determined to have arisen during macro seek operation (S109), and macro seek is reperformed by changing the seek conditions. Specifically, the number of rotations (the rotational speed) of the spindle motor 11 is reduced (S110). When the optical disk 10 is rotationally driven at 8·x rotational speed by the spindle motor 11, the speed is reduced to 6·x rotational speed or 4·x rotational speed. Reducing the rotational speed of the spindle motor 11 is for dampening oscillation responsible for a tooth jump. When a mass eccentricity exists in the optical disk 10, the spindle motor 11 causes oscillation during high-speed rotation, and the oscillation propagates to a transfer mechanism such as the optical pickup 310, the teeth section 310a, the lead screw 110, and the like, which is in turn responsible for step-out or tooth jump. Accordingly, the oscillation can be dampened by reducing the rotational speed of the spindle motor 11. Moreover, in addition to a reduction in the number of rotations of the spindle motor 11, a drive characteristic (profile) of the stepping motor 100 is changed from a normal profile to a low profile (S111). After alteration of the rotational speed of the spindle motor 11 and the rotational speed of the stepping motor 100, the optical pickup 310 is transferred to the innermost track of the optical disk 10, and the address of the optical pickup 310 is reset. Processing subsequent to S101 is reperformed, to thus reperform macro seek. Since a remaining distance to the target address has already been known in S106, re-seek may also be performed by an amount corresponding to the distance. Since the rotational speed of the spindle motor 11 and the rotational speed of the stepping motor 100 have already decreased during reperformance of macro seek, the chance of the ability to perform seek up to a target address without causing a tooth jump is increased.

Figure 3:
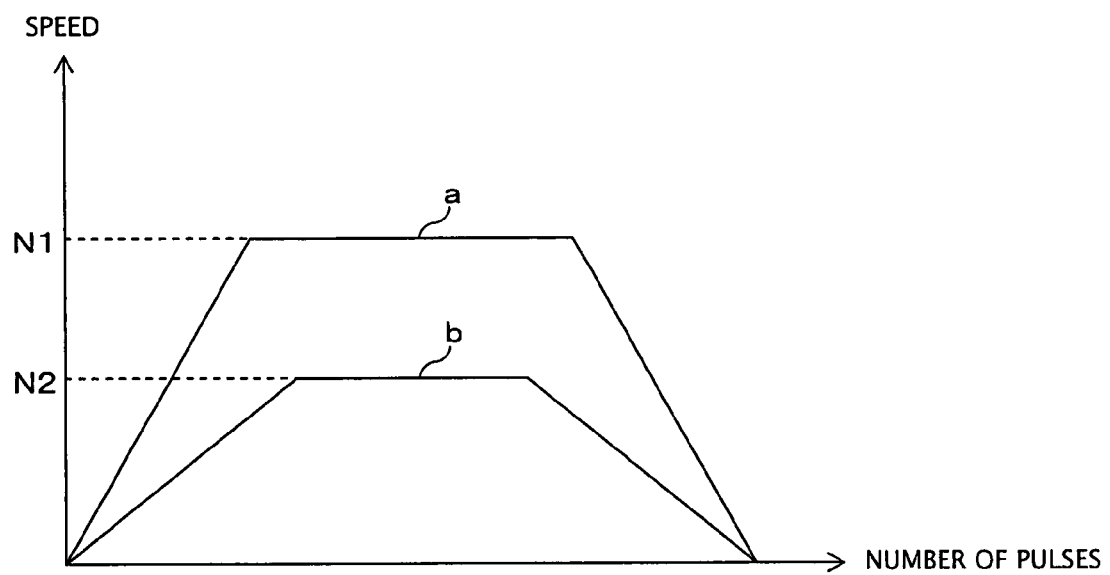
FIG. 3 is a descriptive view of a low profile of the embodiment.

FIG. 3 shows an example low profile employed in S111. A horizontal axis represents the number of pulse signals supplied from the driver 350, and the vertical axis represents the rotational speed of the stepping motor 100. Reference symbol "a" in the drawing represents a normal profile, and reference symbol "b" in the drawing depicts a low profile. According to the ordinary profile, the maximum rotational speed is N1. However, according to the low profile, the maximum rotational speed is N2 (N1>N2). Moreover, acceleration of the low profile is smaller than acceleration of the ordinary profile. Consequently, occurrence of tooth jump can be prevented by means of changing the profile to the low profile.

As mentioned above, in the present embodiment, when the amount of displacement between the current address achieved at the time of completion of macro seek and the target address is equal to or greater than the pitch P, the tooth jump is determined to have arisen. Macro seek is reperformed by changing the seek conditions, and hence the optical pickup 310 can be caused to seek reliably up to the target address instructed by the host machine. Moreover, abrasion of or damage to the teeth section 310a, which would otherwise be induced by occurrence of tooth jump, can be prevented, When dissociation between the current address and the target address exists, re-seek is usually performed from the current address such that the current address achieved at the time of completion of macro seek coincides with the target address. The distance required for re-seek is equal to the amount of displacement, and hence a determination may also be made as to whether or not the re-seek distance is equal to or greater than the pitch P. When the re-seek distance is equal to or greater than the pitch P, the tooth jump is determined to have arisen, the optical pickup 310 is transferred to the innermost track, and macro seek is reperformed subsequently.

Second Embodiment

Figure 4:
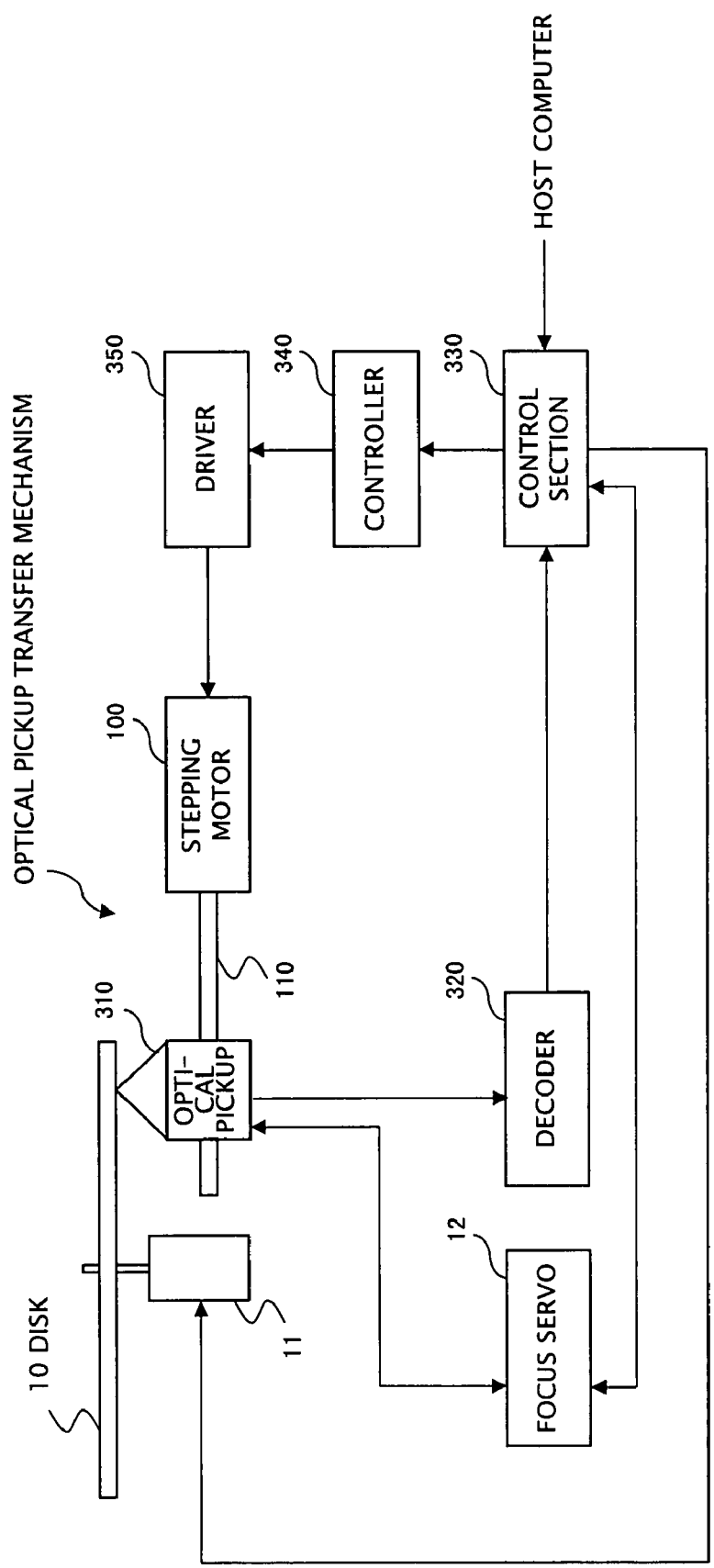
FIG. 4 is a block diagram of an optical disk drive of another embodiment.

FIG. 4 shows the configuration of an optical disk drive of the present embodiment. Although the basic configuration and operation of the optical disk drive are analogous to those of the optical disk drive shown in FIG. 1, the optical disk drive of the present embodiment additionally has the following configuration. Specifically, the optical pickup 310 is driven and controlled in the focusing direction of the optical disk 10 by means of a focus servo 12, as well as being driven and controlled in the tracking direction of the optical disk 10 by means of an unillustrated tracking servo. In response to a focus error signal FE generated from a reproduced signal from the optical pickup 310, the focus servo 12 servo-controls the objective lens of the optical pickup 310 so as to cancel a focus error by means of electromagnetic driving of a focusing coil. In response to a tracking error signal TE generated from the reproduced signal from the optical pickup 310, the tracking servo servo-controls the objective lens of the optical pickup 310 so as to cancel a tracking error, by means of electromagnetic driving of a tracking coil. Methods for generating the focus error signal and the tracking error signal are known, and their details are omitted here for brevity.

In the present embodiment, the focus servo 12 supplies the focusing coil of the optical pickup 310 with a servo signal, to thus effect servo control, and also supplies the control section 330 with the servo signal. When the level of the focus error signal FE falls within a predetermined range, the focus servo 12 generates a servo signal which cancels the focus error, to thus effect servo control. However, when the level of the focus error signal FE exceeds the upper limit value, the focus servo is determined to be inoperable, and focus servo operation is interrupted. In accordance with the servo signal, the control section 330 determines whether or not the focus servo 12 has interrupted focus servo operation. A state—where the focus servo operation is interrupted and the focus control of the optical pickup 310 is inactive (this state is called a "focus-down state")—is detected as a state where tooth jump has arisen. When the tooth jump has arisen, the optical pickup becomes unable to reach the target address. Namely, under normal conditions, a given relationship stands between the number of pulse signals supplied to the stepping motor 100 and the amount of transfer over which the optical pickup 310 is actually transferred. Hence, the amount of transfer of the optical pickup 310 can be computed by counting the number of input pulse signals. Specifically, the number of pulses input to the stepping motor 100 is counted by means of a stepper pointer, so that the amount of transfer of the optical pickup 310; i.e., an address achieved after transfer of the optical pickup, can be specified.

For instance, one micro-step corresponds to the one-256th rotation of the stepping motor 100, and the optical pickup 310 is transferred 7.8 μm by one micro-step. However, when tooth jump has arisen, the relationship between the amount of micro-step and the amount of transfer does not stand, and dissociation arises between the position of the optical pickup acquired by the stepper pointer and the actual position of the optical pickup 310. As a result, although the optical pickup should have reached the target address according to the stepper pointer, the optical pickup is actually present at a position differing from the target address. For this reason, when the tooth jump is determined to have arisen, the control section 330 interrupts macro seek operation even in the course of macro seek operation, thereby resolving dissociation between the target address and the current address induced by the tooth jump. Moreover, even after completion of the macro seek without interruption thereof, the control section 330 detects occurrence of tooth jump from the amount of displacement between the current address achieved after completion of macro seek and the target address as in the case of the previously-described first embodiment.

Figure 5:
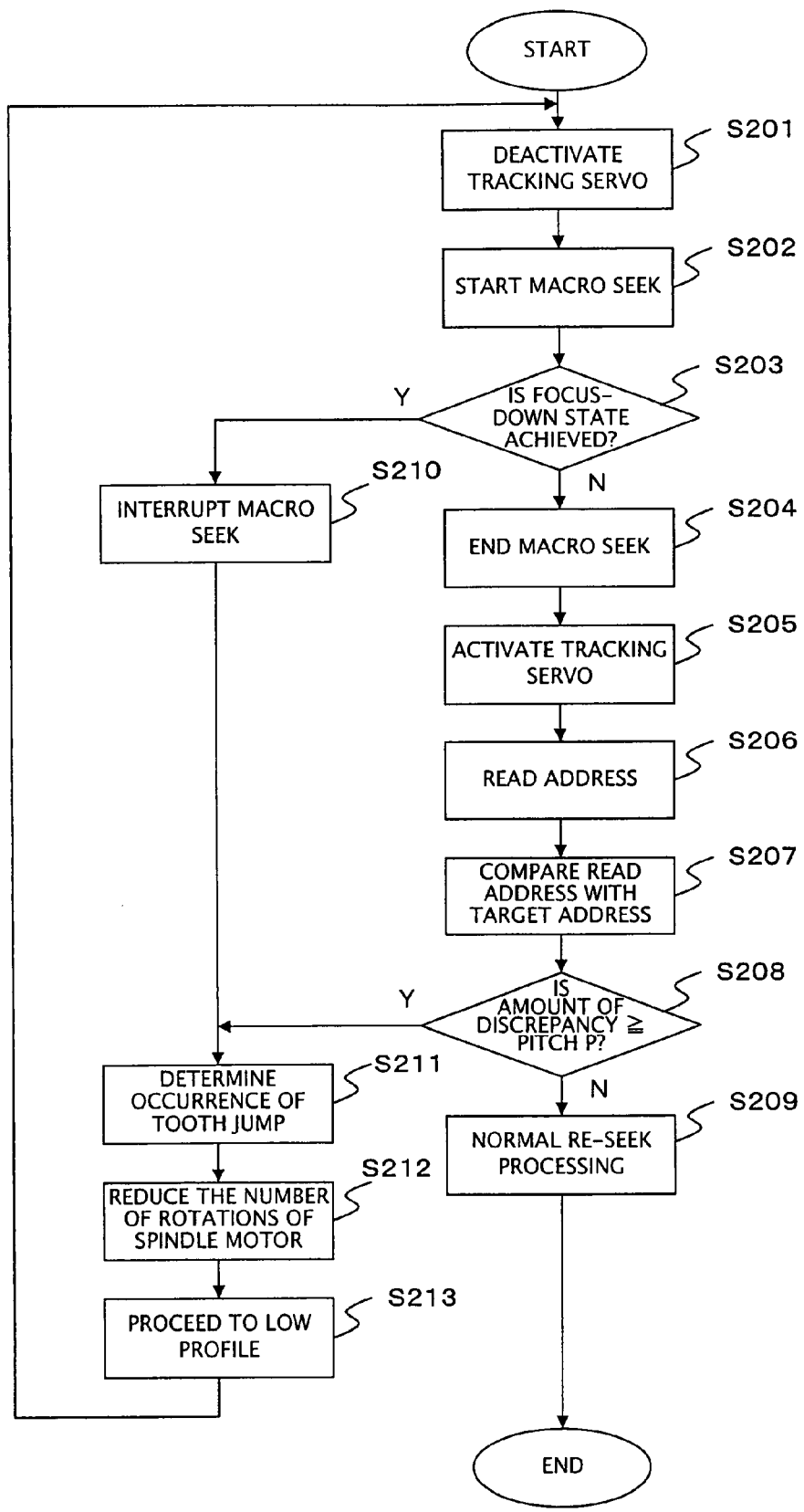
FIG. 5 is a processing flowchart of the other embodiment.

FIG. 5 shows a processing flowchart of the present embodiment. Upon receipt of a seek operation start command from the host machine, the tracking servo is deactivated (S201), and macro seek is commenced by means of driving the stepping motor 100 (S202). After transfer of the optical pickup 310 has been commenced by means of starting macro seek, the control section 330 determines, from the servo signal from the focus servo 12, whether or not the focus-down state has arisen (S203). The focus-down state appears when the level of the focus error signal FE has exceeded the predetermined range as mentioned above. When the tooth jump has arisen, the teeth section 310a formed in the optical pickup 310 can be considered to be disengaged from the lead screw 110, to thus run onto the groove of the lead screw 110, whereupon the objective lens of the optical pickup 310 is moved abruptly in the focusing direction by means of oscillation, so that the level of the focus error signal FE is increased. Accordingly, when the focus-down state has arisen, the control section 330 interrupts macro seek (S210), thereby determining that the tooth jump has arisen (S211). Subsequent processing is analogous to the counterpart of the first embodiment, and the macro seek is reperformed by changing the seek conditions; specifically, by decreasing the rotational speed of the spindle motor 11 and the rotational speed of the stepping motor 100 (S212, S213). Even when the macro seek is interrupted, the optical pickup 310 is transferred to the innermost track, and the current address is reset to zero. Subsequently, macro seek is preferably reperformed. After it has been ascertained that the address is read and reset to zero after transfer of the optical pickup to the innermost track, macro seek is reperformed.

When the focus-down state has not arisen, the control section 330 determines that the optical pickup 310 has been transferred normally and completes macro seek (S204); and reactivates the tracking servo (S205). The decoder 320 reads the current address achieved after completion of the macro seek (S206) and supplies the control section 330 with the current address. The control section 330 compares the current address, which is achieved at the time of completion of macro seek and supplied from the decoder 320, with the target address supplied from the host machine (S207). Specifically, the amount of displacement between the target address and the current address is computed, and the thus-computed amount of displacement is compared with the pitch P of the lead screw 110.

When a result of comparison shows that the amount of displacement is smaller than the pitch P (NO is selected in S208), tooth jump is determined not to have arisen during the macro seek, and the macro seek is determined to have been completed normally, so that ordinary re-seek processing is subsequently performed (S209).

When the macro seek is not interrupted but the amount of displacement is equal to or greater than the pitch P (YES is selected in S208), the tooth jump is determined to have arisen during macro seek operation (S211), and the macro seek is reperformed by altering the seek conditions. Specifically, the number of rotations (rotational speed) of the spindle motor 11 is reduced (S212), and the drive characteristic (profile) of the stepping motor 100 is altered from the normal profile to the low profile (S213). After the rotational speed of the spindle motor 11 and the rotational speed of the stepping motor 100 have been altered, the optical pickup 310 is transferred to the innermost track of the optical disk 10, thereby resetting the address of the optical pickup 310. Processing subsequent to S201 is reperformed, to thus reperform macro seek. Since the current address has already been known in S206 and S207, the re-seek may also be performed by an amount corresponding to a remaining distance.

As mentioned above, in the present embodiment, occurrence/nonoccurrence of tooth jump is determined during the macro seek and after completion of the macro seek, and hence occurrence of the tooth jump can be detected reliably.

In the present embodiment, when the tooth jump has been detected, the macro seek is reperformed by reducing the rotational speed of the stepping motor 100 as well as the rotational speed of the spindle motor 11, but it may be the case that only the rotational speed of the spindle motor 11 is reduced. Alternatively, the macro seek may also be reperformed by changing another condition.

Although the present embodiment has provided the case of the stepping motor 100, the present invention can also be applied likewise to a case where the optical pickup is driven by a DC motor.

Further, in the present embodiment, the focus-down state is detected in accordance with the servo signal from the focus servo 12. However, a comparison circuit from comparing the level of a focus error signal with a predetermined threshold value may also be provided, thereby detecting a focus-down state in accordance with a result of comparison output from the comparison circuit. The focus servo 12 may also have the comparison circuit. There may be adopted a configuration wherein the comparison circuit compares the level of the focus error signal FE with a predetermined threshold value, and interrupts servo control operation and supplies the control section 330 with an anomaly signal when the level of the focus error signal FE has exceeded the predetermined threshold value. The essential requirement for the control section 330 is to detect occurrence of tooth jump from the anomaly signal supplied from the comparison circuit of the focus servo 12 and interrupt the macro seek operation.

Moreover, although in the present embodiment tooth jump is detected, when the stepping motor 100 is used, the amount of positional displacement between the target address and the current address may be compared with a threshold value other than the pitch P, to thus detect occurrence of step-out of the stepping motor 100 in parallel with detection of the tooth jump, as described in the related art. In this case, after the amount of displacement has been determined to be smaller than the pitch P in S107 or S208, the amount of displacement is compared with a predetermined threshold value (the threshold value smaller than the pitch P) When the amount of displacement is equal to or greater than the threshold value, it is better to determine that step-out has occurred and to reperform the macro seek.

What is claimed is:

1. An optical disk drive comprising:
a motor;
an optical pickup which irradiates an optical disk with a laser beam;
a transfer mechanism which engages with the motor and transfers the optical pickup in a radial direction of the optical disk by means of rotation of the motor; and
control means which compares the amount of displacement between an address achieved after transfer operation performed by the transfer mechanism and a target address with a pitch of the transfer mechanism and determines occurrence of an anomaly in the transfer mechanism when the amount of displacement is equal to or greater than the pitch.

2. The optical disk drive according to claim 1, wherein the anomaly is tooth jump of the transfer mechanism.

3. The optical disk drive according to claim 1, wherein, when having determined that an anomaly has arisen in the transfer mechanism, the control means changes transfer conditions, thereby causing the transfer mechanism to reperform transfer of the optical pickup.

4. The optical disk drive according to claim 3, wherein the change in the transfer conditions is a decrease in rotational speed of the motor.

5. The optical disk drive according to claim 3, wherein the change in the transfer conditions is a decrease in rotational speed of a spindle motor which rotationally drives the optical disk.

6. An optical disk drive comprising:
a motor;
an optical pickup which irradiates an optical disk with a laser beam;
a transfer mechanism which engages with the motor and transfers the optical pickup in a radial direction of the optical disk by means of rotation of the motor;
focus servo means for subjecting the optical pickup to focus control; and
control means which determines occurrence of an anomaly in the transfer mechanism when the focus control of the focus servo means is interrupted in accordance with a servo signal from the focus servo means, to thus interrupt transfer of the optical pickup performed by the transfer mechanism, compares the amount of displacement between an address achieved after transfer operation of the transfer mechanism and a target address with a pitch of the transfer mechanism when the focus control is not interrupted, and determines occurrence of an anomaly in the transfer mechanism when the amount of displacement is equal to or greater than the pitch.

7. The optical disk drive according to claim 6, wherein the anomaly is tooth jump of the transfer mechanism.

8. The optical disk drive according to claim 6, wherein, when having determined that an anomaly has arisen in the transfer mechanism, the control means changes transfer conditions, thereby causing the transfer mechanism to reperform transfer of the optical pickup.

9. The optical disk drive according to claim 8, wherein the change in the transfer conditions is a decrease in rotational speed of the motor.

10. The optical disk drive according to claim 8, wherein the change in the transfer conditions is a decrease in rotational speed of a spindle motor which rotationally drives the optical disk.

11. An optical disk drive comprising:
a motor;
an optical pickup which irradiates an optical disk with a laser beam;
a transfer mechanism which engages with the motor and transfers the optical pickup in a radial direction of the optical disk by means of rotation of the motor;
focus servo means which generates a focus error signal from a reproduced signal from the optical pickup and subjects the optical pickup to focus control in accordance with the focus error signal; and
control means which determines occurrence of an anomaly in the transfer mechanism when the level of the focus error signal exceeds a predetermined threshold value, to thus interrupt transfer of the optical pickup performed by the transfer mechanism, compares the amount of displacement between an address achieved after transfer operation performed by the transfer mechanism and a target address with a pitch of the transfer mechanism when the focus control operation is not interrupted, and determines occurrence of an anomaly in the transfer mechanism when the amount of displacement is equal to or greater than the pitch.

12. The optical disk drive according to claim 11, wherein the anomaly is tooth jump of the transfer mechanism.

13. The optical disk drive according to claim 11, wherein, when having determined that an anomaly has arisen in the transfer mechanism, the control means changes transfer conditions, thereby causing the transfer mechanism to reperform transfer of the optical pickup.

14. The optical disk drive according to claim 13, wherein the change in the transfer conditions is a decrease in rotational speed of the motor.

15. The optical disk drive according to claim 13, wherein the change in the transfer conditions is a decrease in rotational speed of a spindle motor which rotationally drives the optical disk.

* * * * *